United States Patent [19]

Arai et al.

[11] Patent Number: 5,429,644
[45] Date of Patent: Jul. 4, 1995

[54] METHOD OF MANUFACTURING SOLID OXIDE FUEL CELL

[75] Inventors: Toshio Arai, Toyama; Masaki Sato, Ichikawa; Takayoshi Yoshimura, Kurobe; Minoru Tamura, Uozu, all of Japan

[73] Assignee: YKK Corporation, Tokyo, Japan

[21] Appl. No.: 285,979

[22] Filed: Aug. 4, 1994

Related U.S. Application Data

[62] Division of Ser. No. 25,928, Mar. 3, 1993, Pat. No. 5,376,468.

[30] Foreign Application Priority Data

Mar. 27, 1992 [JP] Japan .................................. 4-70944

[51] Int. Cl.⁶ ............................................. H01M 8/00
[52] U.S. Cl. ................................. 29/623.4; 429/32; 429/161
[58] Field of Search ............... 29/623.4; 429/30, 32, 429/34, 41, 161

[56] References Cited

U.S. PATENT DOCUMENTS 5,256,499 10/1993 Minh et al. ............... 29/623.4 X
5,312,700 5/1994 Ishida ........................ 29/623.4 X

FOREIGN PATENT DOCUMENTS 1596119 6/1966 Germany .
2023489 5/1970 Germany .
2614727 6/1976 Germany .
4033284 10/1990 Germany .

*Primary Examiner*—John S. Maples
*Attorney, Agent, or Firm*—Flynn, Thiel, Boutell & Tanis

[57] ABSTRACT

A dense substrate for a solid oxide fuel cell, comprising: a base portion, support portions and fixing portions all of which project from the base portion so as to be arranged sequentially in one direction; grooves formed between the support portions and the fixing portions or between the support portions; and mount portions which are provided on the support portions between the fixing portions for mounting and affixing at least cell sections thereon. A solid oxide fuel cell is easily manufactured at a reduced cost by arranging a plurality of cell sections and, if required, plate sections, on the mount portions of the above dense substrate; affixing the cell sections and, when used, plate sections, onto the mount portions with an insulating bonding agent; and joining adjacent cell sections together with interconnections.

1 Claim, 6 Drawing Sheets 5,429,644

METHOD OF MANUFACTURING SOLID OXIDE FUEL CELL

This is a division of Ser. No. 08/025 928, filed Mar. 3, 1993, now U.S. Pat. No. 5,376,468.

BACKGROUND OF THE INVENTION

1. Field of the Invention

This invention relates to a dense substrate for a solid oxide fuel cell (which will hereinafter be referred to as SOFC) in which an electrochemical reaction is carried out to take out electric energy, a solid oxide fuel cell using the same substrate, and a method of manufacturing the same solid oxide fuel cell.

2. Description of the Prior Art

There are known SOFC's which include a tubular SOFC (Japanese Patent Laid-Open No. 73246/1979) formed by providing a plurality of single cells, each of which consists of a fuel electrode, electrolyte and an air electrode, on the outer surface of an elongated cylindrical porous support tube, and connecting the single cells in series, and a monolithic SOFC (Japanese Patent Laid-Open No. 100376/1985) formed by sandwiching a flat cell section, which consists of three layers of a fuel electrode, an electrolyte and an air electrode, between corrugated mutual-connection walls each of which consists of three layers of an air electrode, an interconnection and a fuel electrode.

Regarding the practical use of SOFC's, a tubular SOFC can be manufactured comparatively easily but a support tube cannot be made extremely thin in view of the structure thereof. Therefore, this type-of SOFC does not have as high of an output performance per volume. A monolithic SOFC has a high output performance per volume but involves very difficult manufacturing problems in the production of a cell, a gas sealing, assembling, etc. The inventors of the present invention then filed a patent application, i.e. Japanese Patent Application No. 106610/1990, which has been laid-open to public inspection under Laid-Open No. 6752/1992, for the solid oxide fuel cell disclosed therein, so as to solve these problems. According to this invention, the portion of a dense substrate to which a cell section is to be fixed is subjected to a mechanical boring process. Carrying out this process is difficult, and presents a problem concerning the dimensional accuracy thereof.

Moreover, in a conventional method of this kind, a plurality of cell sections are manufactured simultaneously or assembled unitarily at a time. Consequently, when a failure occurs in one cell section, there is the possibility that the whole assembly cell stacks or cell sections become unusable.

SUMMARY OF THE INVENTION

Therefore, an object of the present invention is to provide a highly reliable SOFC which permits the formation of cell mount portions of a dense substrate without carrying out a boring process therein, and therefore is capable of being manufactured easily and at a reduced cost, a method of manufacturing the same SOFC, and a dense substrate for the same SOFC.

In order to solve the above problems, the inventors of the present invention have earnestly studied the construction of a dense substrate to obtain the knowledge that it is effective to provide grooves in a dense substrate and arrange cells, which have been produced in advance, in these grooves, and come to achieve the present invention.

The present invention is as follows:

(1) A dense substrate for a solid oxide fuel cell, comprising: a base portion, support portions and fixing portions, all of which project from the base portion so as to be arranged sequentially in one direction; grooves formed between the support portions and the fixing portions and between the support portions; and mount portions which are provided on the support portions between the fixing portions for mounting and affixing at least cell sections thereon.

(2) A solid oxide fuel cell having a plurality of cell sections and, if required, a plurality of plate sections, on the mount portions of the dense substrate defined in (1) above, the cell sections and the mount portions being joined together by an insulating bonding agent, adjacent cell sections being joined together with interconnections.

(3) A method of manufacturing a solid oxide fuel cell, comprising the steps of:
arranging a plurality of cell sections and, if required, plate sections, on the mount portions of the dense substrate defined in (1) above;
fixing the cell sections and, when used, plate sections, onto the mount portions with an insulating bonding agent; and
joining adjacent cell sections together with interconnections.

DETAILED DESCRIPTION OF THE PREFERRED EMBODIMENTS

Figure 1:
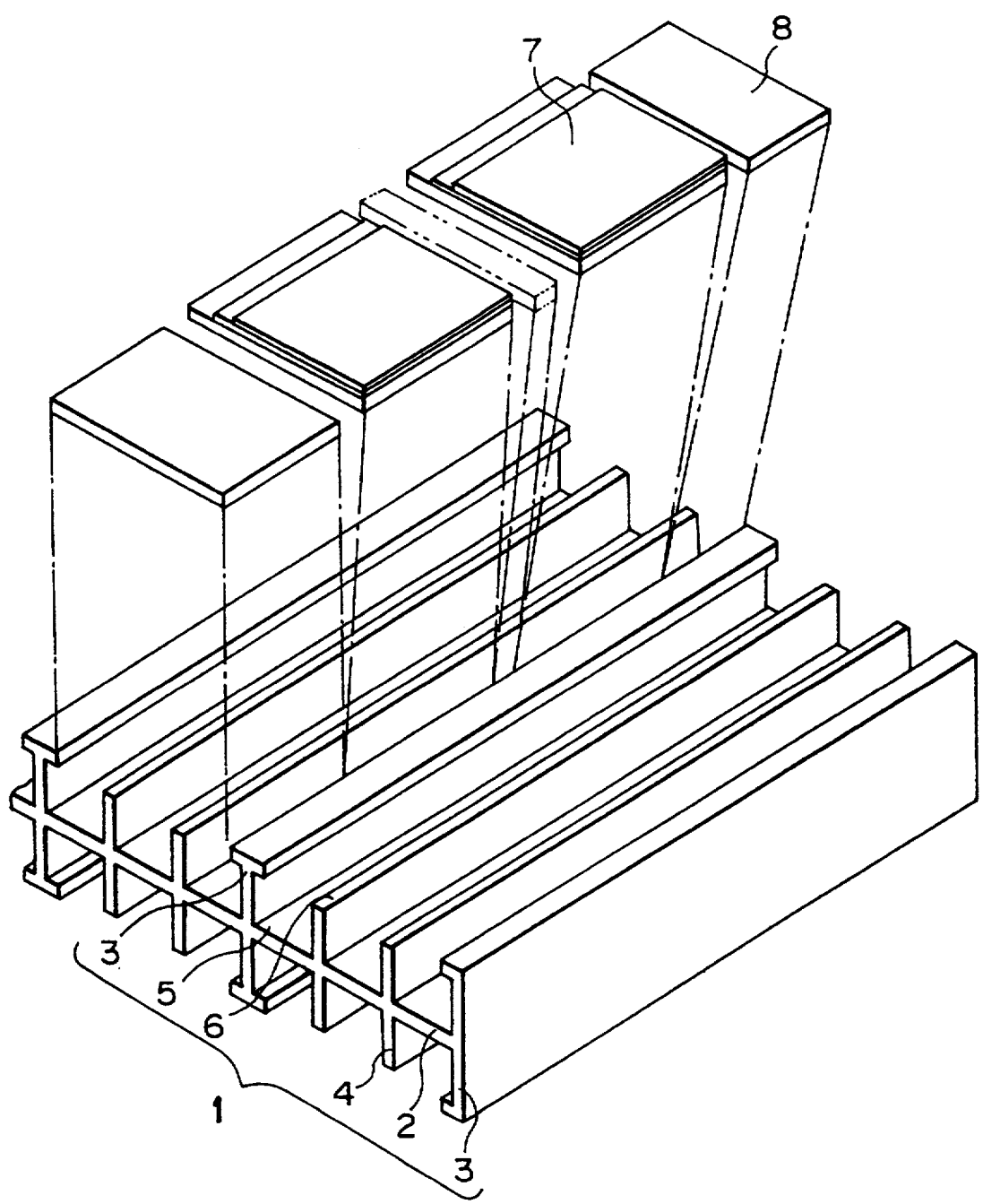
FIG. 1 is a schematic view showing the dense substrate according to the present invention and the relation of arrangement between cell sections and plate section mounted thereon.

An example of a dense substrate 1 for a solid oxide fuel cell according to the present invention is shown in FIG. 1. Referring to FIG. 1, a reference numeral 2 denotes a base portion, 3 fixing portions, 4 support portions, 5 grooves and 6 mount portions provided between the fixing portions and on the support portions. As is clearly noted from FIG. 1, in the solid oxide fuel cell according to the present invention, a plurality of cell sections 7 are mounted on and fixed to the mount portions 6 on the support portions 4 projecting from the base portion 2 of the dense substrate 1, and the fixing portions 3 also projecting from the base portion 2. A dense plate section 8 is provided as necessary on an end portion of the dense substrate 1 or between the cell sections 7. The cell sections and plate sections are affixed to the dense substrate 1 by an insulating bonding agent. Consequently, hollow portions 15 are formed, which are defined by the grooves 5, cell sections 7 and plate sections 8, in the dense substrate 1.

Figure 8:
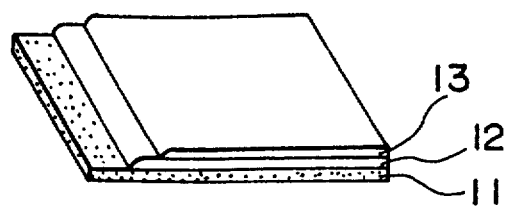
FIG. 8 is a perspective view of a cell section using a porous air electrode base.
Figure 9:
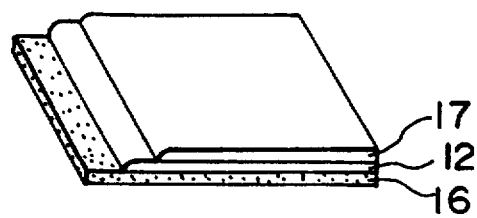
FIG. 9 is a perspective view of a cell section using a porous fuel electrode base.
Figure 10:
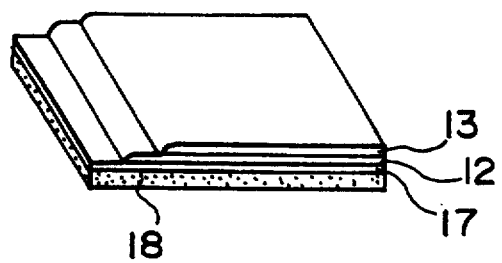
FIG. 10 is a perspective view of a cell section formed by laminating an air electrode, an electrolyte and a fuel electrode in the mentioned order on a porous support base.
Figure 11:
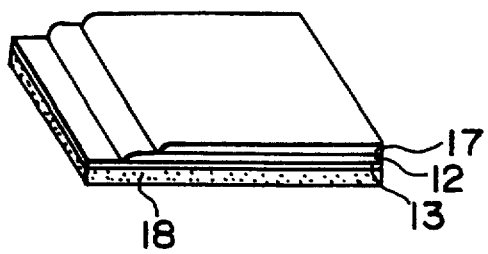
FIG. 11 is a perspective view of a cell section formed by laminating a fuel electrode, an electrolyte and an air electrode in the mentioned order on a porous support base.

A first type of cell section produced in advance so as to be used in the present invention is formed, as shown in FIGS. 8 and 9, by laminating on a porous base of an electrode material, which consists of either a porous air electrode base 11 or a porous fuel electrode base 16, an electrolyte film 12 and then another electrode film, i.e. a fuel electrode film 13 or an air electrode film 17. A second type of cell section is formed, as shown in FIGS. 10 and 11, by laminating an air electrode film 17 (or a fuel electrode film 13), an electrolyte film 12 and a fuel electrode film 13 (or an air electrode film 17) in the mentioned order on a porous base 18 which constitutes a support body.

In the above example, the hollow dense substrate 1 consists preferably of a ceramic material, an electrically insulating material, and, for example, alumina, magnesia or a mixture thereof are suitably used.

The electrolyte film 12 consists suitably of yttria-stabilized zirconia (which will hereinafter be referred to as YSZ). The porous electrode base and electrode film consisting of an air electrode film are suitably composed of alkaline earth metal-added $LaMnO_3$ and $LaCoO_3$, and the porous electrode base and electrode film consisting of a fuel electrode film Ni-zirconia cermet.

The porous base, which is to constitute a support body, consists preferably of a porous ceramic material. For example, alumina, magnesia, a mixture thereof and stabilized zirconia are suitably used, and it is more desirable that electronic conductivity be provided to the porous base if possible.

The cell sections 7 produced in advance are placed on the mount portions 6 between the affixing portions 3, 3 of the dense substrate 1 by preferably fitting the former on the latter, and then affixing, and the electrodes of adjacent cell sections are connected in series and in parallel by interconnections. When the dense substrate and cell sections and the adjacent cell sections are joined together with an insulating bonding agent as stated in Claim 3, to form interconnections, an SOFC having excellent gas sealability can be obtained.

When a gas sealing film 14 is formed in the fitted portion and an interconnection thereafter is formed, or, when a cell section is affixed to an insulating bonding agent and, then, a gas sealing film and an interconnection are formed in that order, an SOFC having a higher gas sealability can be obtained.

The interconnection referred to above consists suitably of a material having electronic conductivity and which is stable in an oxidation-reduction atmosphere, for example, a perovskite oxide obtained by adding an alkaline earth metal to $LaCrO_3$.

The bonding agent consists preferably of a material which is stable in an oxidation-reduction atmosphere, has insulating characteristics and is capable of being densified, such as a ceramic material including alumina, silica and zirconia, and the gas sealing film an electrically insulating material, such as alumina.

Out of the structural elements of the SOFC, the hollow dense substrate is formed by extrusion, and the porous electrode base and porous support base by a doctor blade method and a powder pressing method.

The electrode film, electrolyte film, interconnection and gas sealing film are formed by film forming techniques including dry type methods, such as plasma spray, gas flame spray, CVD and PVD, and wet type methods, such as a screen printing method and a dipping method.

An SOFC according to the present invention in which the porous electrode base for cell sections consists of an air electrode will now be described. When oxygen is supplied to the hollow portions of the dense substrate while supplying hydrogen to the outer portion of the dense substrate, which is on the side of the fuel electrode, with the SOFC maintained at about 1000° C., an electrochemical reaction occurs to generate electric energy.

According to the present invention, the following effects can be obtained.

(1) Since the cell sections are produced in advance, an imperfect cell section can be rejected, and perfect cell sections only can be set on the dense substrate. Therefore, the yield and reliability of the SOFC are improved.

(2) Since cell sections produced in advance are set on a dense substrate, the dense substrate does not receive the influence of the processing heat used during the formation of electrode films and electrolyte films, unlike the case where cell sections are formed by a vapor deposition method or a spray method on a dense substrate, so the reliability of the SOFC is improved.

(3) Since the cell section has a simple construction and can be mass-produced simply and mounted on a dense substrate easily, the manufacturing cost decreases.

(4) The fixing portions, support portions, mount portions and grooves which are used to Set and affix cell sections can be formed integrally when a dense substrate is extruded. Therefore, the manufacturing steps are simplified. Further, unlike a conventional SOFC, the SOFC according to the present invention does not require a process for boring a substrate. This also enables the manufacturing cost to decrease.

EXAMPLE 1

A first embodiment of the present invention will now be described with reference to the drawings.

Figure 2:
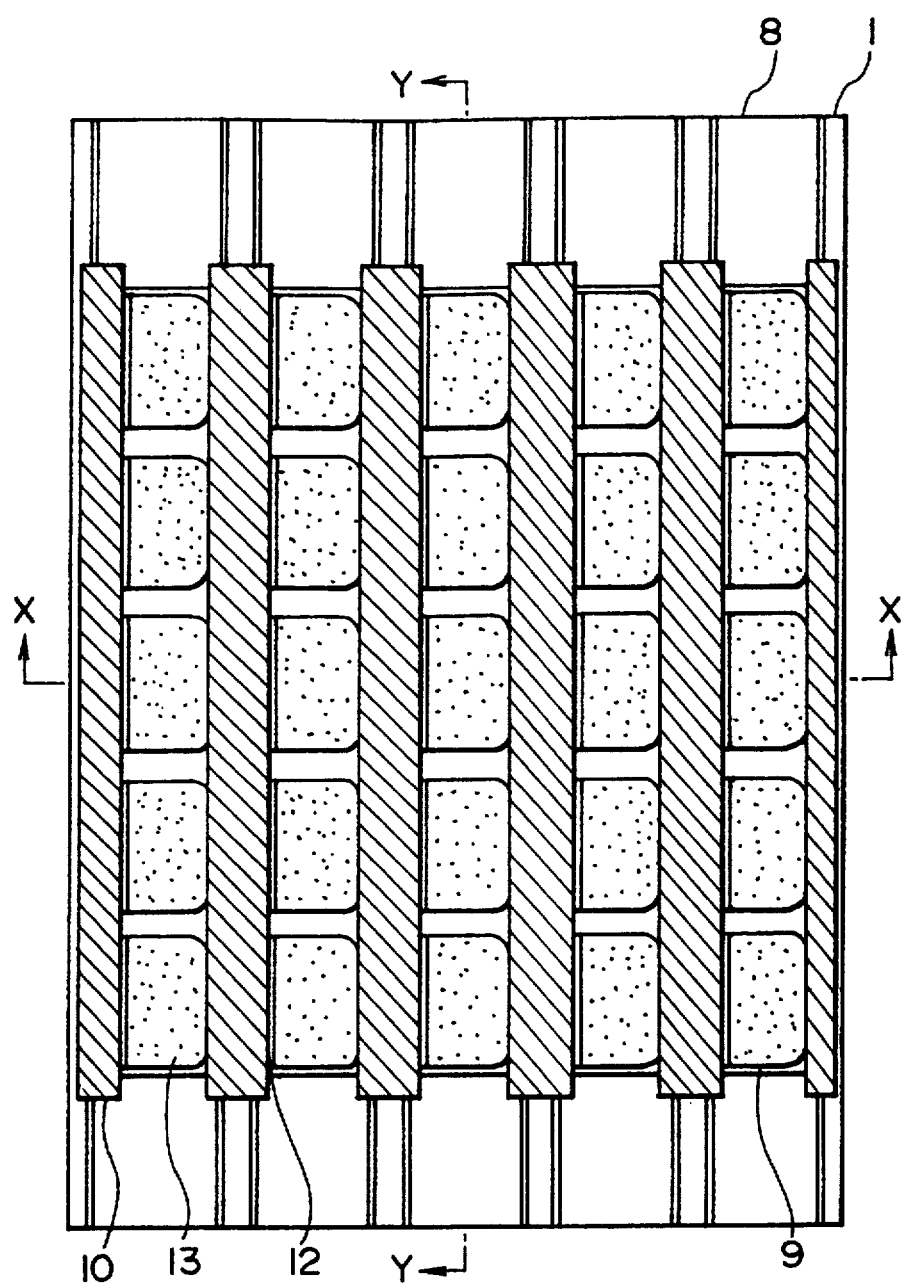
FIG. 2 is a plan view showing the outline of Example 1 of the SOFC according to the present invention.
Figure 3:
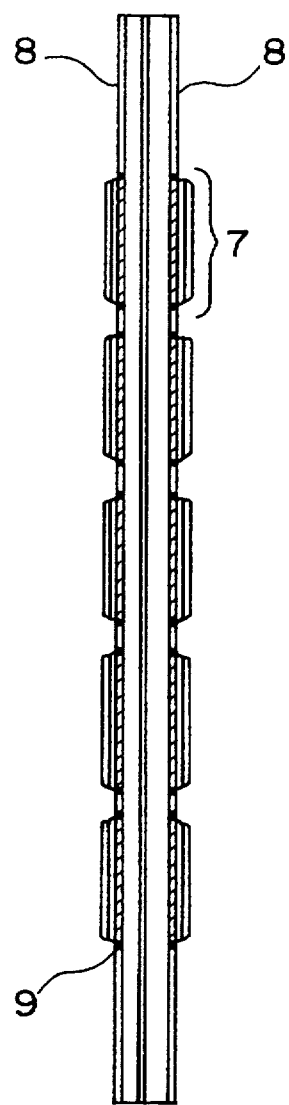
FIG. 3 is a cross-sectional view of the SOFC taken along the line Y—Y of FIG. 2.
Figure 4:
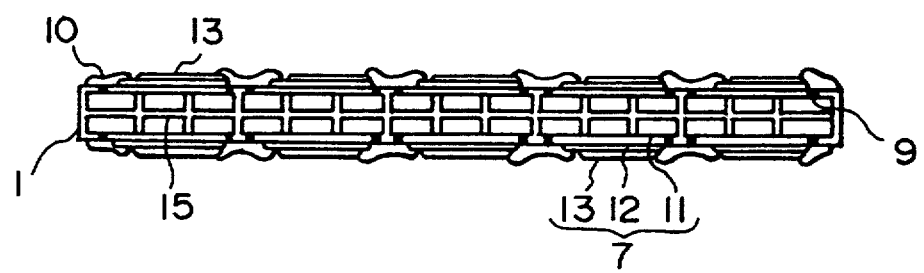
FIG. 4 is a cross-sectional view of the SOFC taken along the line X—X of FIG. 2.

FIG. 2 is a plan view showing the outline of an SOFC as a whole, and FIGS. 3 and 4 are sectional views taken along the lines Y—Y and X—X, respectively.

The dense substrate 1 was formed from a raw material, i.e. alumina, by extrusion, and then fired at 1400°–1700° C. A method of manufacturing the cell section 7 will now be described. First, a green film was formed from $La_{0.8}Sr_{0.2}MnO_3$ by a doctor blade method, and the film was then cut into pieces with a cutter. The cut pieces were fired at 1200°–1500° C. to obtain porous air electrode bases 11. The porous air electrode base 11 was then masked to form a current takeout portion, and yttria stabilized zirconia was then sprayed onto the base 11 by a plasma spray method to form an electrolyte film 12. Finally, the upper surface of the electrolyte film 12 was masked, and NiO-YSZ was then sprayed onto the electrolyte film 12 by a gas flame spray method to form a fuel electrode film 13 and complete the production of a cell section 7.

A plurality of cell sections 7 thus produced were affixed to the fixing portions 3 and mount portions 6 of the dense substrate 1 by an alumina bonding agent 9. If necessary, dense plate sections 8 were then affixed to the portions of the dense substrate 1, which were adjacent to the cell sections 7, by an insulating bonding agent. In this embodiment, 25 cell sections were affixed to one surface of the dense substrate 1, which were then masked, and $LaMgCrO_3$ was thereafter sprayed onto the dense substrate 1 by a plasma spray method or a gas flame spray method to form interconnections 10, the cell sections 7 being connected in series and in parallel. After the cell sections have been affixed to one surface of the dense substrate 1, the other surface was subjected to the same operations to produce an SOFC.

EXAMPLE 2

A second embodiment will now be described with reference to FIGS. 5, 6 and 7.

Figure 5:
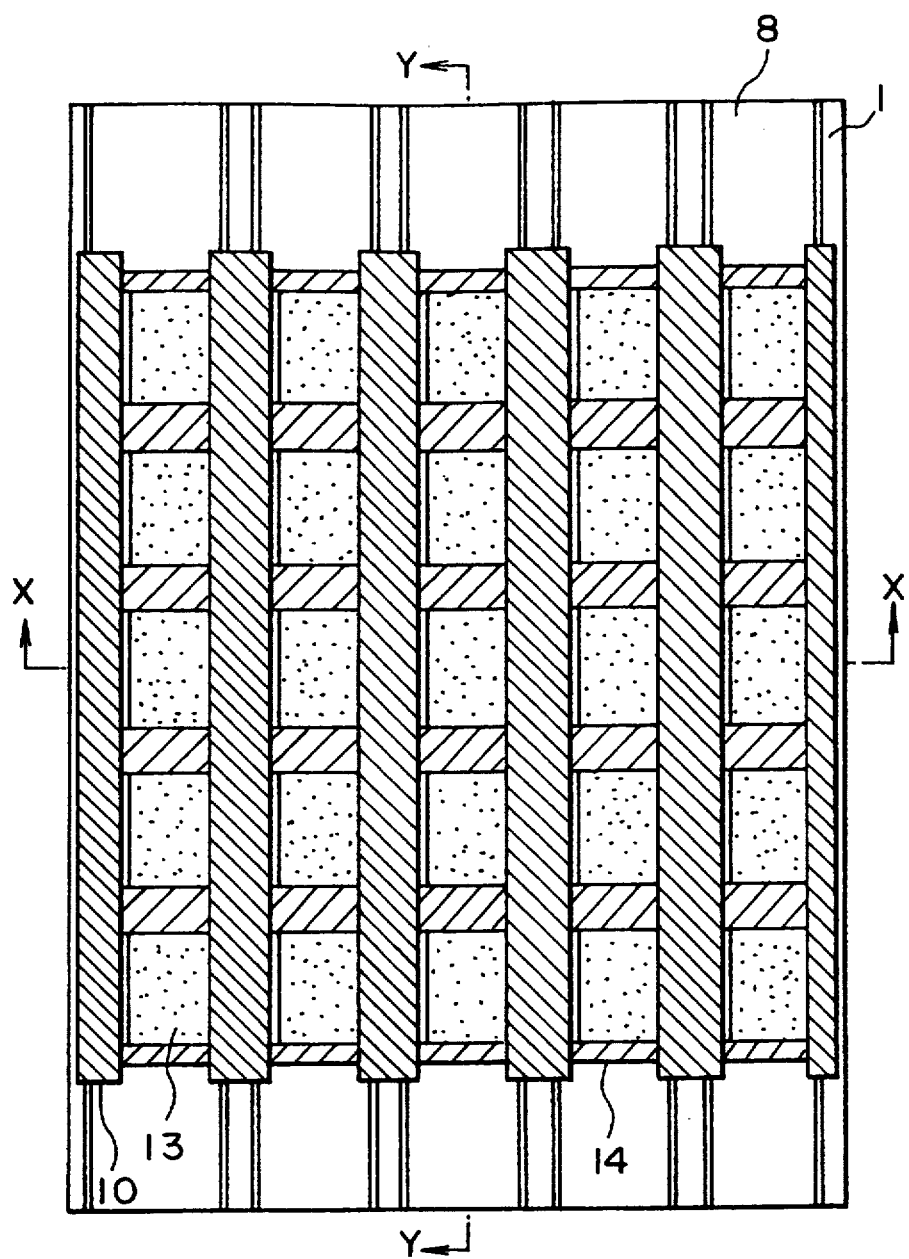
FIG. 5 is a plan view showing the outline of Example 2 of the SOFC.
Figure 6:
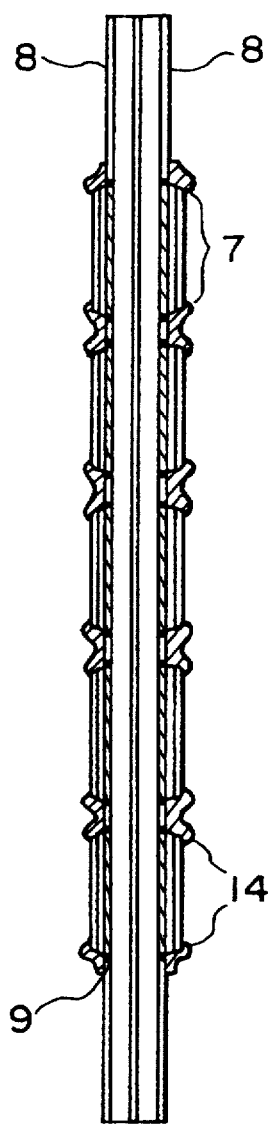
FIG. 6 is a cross-sectional view of the SOFC taken along the line Y—Y of FIG. 5.
Figure 7:
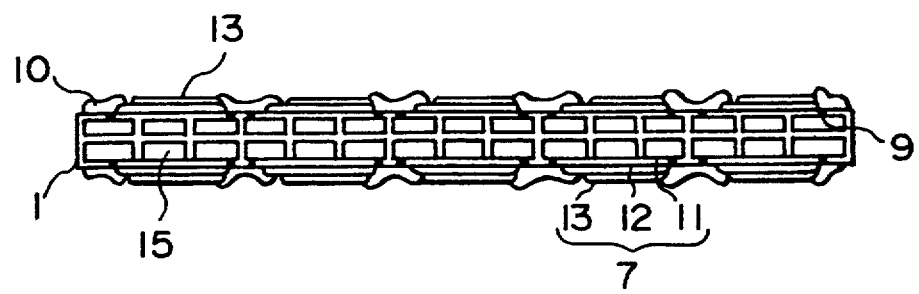
FIG. 7 is a cross-sectional view of the SOFC taken along the line X—X of FIG. 5.

FIG. 5 is a plan view showing the outline of an SOFC as a whole, and FIGS. 6 and 7 are sectional views taken along the lines Y—Y and X—X, respectively. The gas sealing films 14 shown in the drawings were formed by spraying alumina by a plasma spray method after the cell sections 7 had been affixed to the dense substrate 1 and before the interconnections 10 had been formed. The other materials used and the manufacturing method employed were the same as those in Example 1.

An electric current can be generated by supplying oxygen to the hollow portions 15 defined by the dense substrate 1, cell sections 7 and dense plate section 8, and hydrogen to the fuel cell side portion of the completed SOFC, with the SOFC maintained at about 1000° C.

The shapes of the dense substrate 1, cell sections 7, dense plate section 8 and masking films are not limited to those of the parts in the above-described embodiments; they may be formed in other shapes. The effect of an SOFC which uses a porous support base for the cell sections 7, owing to the above-described manufacturing method, and that of an SOFC provided with fuel electrodes on the side of the hollow portions 15 thereof, owing to the same method, are identical to each other.

As described in detail above, the portions of a conventional dense substrate to which cell sections are to be affixed are subjected to a boring process (mechanical process), so that a conventional dense substrate has processing difficulty and problems concerning the dimensional accuracy thereof. On the other hand, the dense substrate according to the present invention can be manufactured easily and in a high yield by, for example, extrusion (molding), and enables the reduction of the manufacturing cost. Since this dense substrate consisting of a fragile material does not require a boring process, it has a high dimensional accuracy. In the solid oxide fuel cell, cell sections produced in advance are set on a dense substrate, and interconnections or gas sealing films and interconnections are then formed. Therefore, imperfect cell sections can be rejected before an SOFC has been assembled, and the dense substrate receives little influence of processing heat. This enables the yield and reliability of the SOFC to be improved. Moreover, according to the manufacturing method of the present invention, the production of solid oxide fuel cell can be carried out with a high efficiency, and this method is suitable for the mass production of the same products and enables the yield thereof to be improved.

What is claimed:

1. A method of manufacturing a solid oxide fuel cell, comprising the steps of:

arranging a plurality of cell sections on mount portions of a dense substrate, said dense substrate comprising: a base portion, support portions and fixing portions all of which project from said base portion so as to be arranged sequentially in one direction; grooves formed between said support portions and said fixing portions and between said support portions; and mount portions which are provided on said support portions between said fixing portions for mounting and affixing at least cell sections thereon;

affixing said cell sections onto said mount portions with an insulating bonding agent; and joining adjacent cell sections together with interconnections.

* * * * *